UNITED STATES PATENT OFFICE.

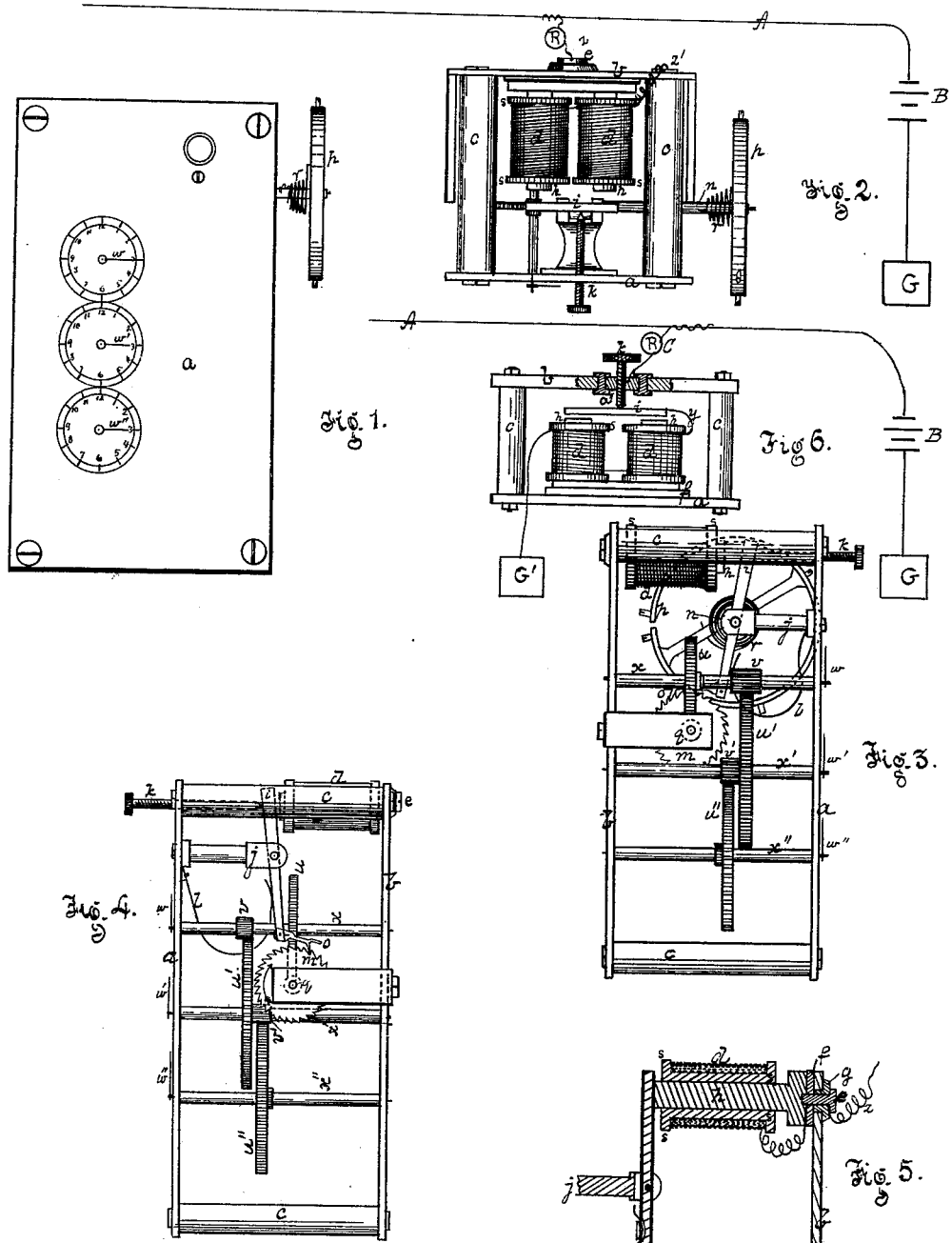

JOSEPH R. FINNEY, OF PITTSBURG, PENNSYLVANIA.

APPARATUS FOR MEASURING THE ELECTRIC CURRENT.

SPECIFICATION forming part of Letters Patent No. 231,415, dated August 24, 1880.

Application filed November 7, 1879.

*To all whom it may concern:*

Be it known that I, JOSEPH R. FINNEY, of Pittsburg, in the county of Allegheny and State of Pennsylvania, have invented a new and useful Improvement in Apparatus for Measuring and Registering the Force of the Electric Current; and I do hereby declare the following to be a full, clear, and exact description of my new and improved apparatus for measuring and registering the force of the current of dynamic electricity generated by a galvanic battery or by an electro-magnetic induction-machine.

In devices hitherto used for measuring the force of the voltaic or magneto-electric current, such as galvanometers and voltameters, the strength or dynamic force of the current only is indicated, together with the variation in intensity of the current from time to time.

The object of my invention is to advance a step farther in the measurement of the electric current by taking account not only of the force of the current, but also of the time during which it is operated, and thus by including in the measurement the combined force and time to obtain a measure of the quantity of electric current employed for any given purpose. By this means it will be easy to ascertain the quantity of electric current used to run a machine or to operate an electric candle.

To enable others skilled in the art to construct and use my improved device for measuring the electric current, I will proceed to describe its construction and operation.

In the accompanying drawings, Figure 1 is a front or face view of my measuring device. Fig. 2 is an end view. Figs. 3 and 4 are side views from opposite sides. Fig. 5 is a section through the circuit-breaker, showing the operation of the armature to operate the registering device.

In the several figures like letters indicate the same parts.

My invention consists in the combination of an automatic circuit-breaker with clock-work gearing and dial-plates and a balance-wheel or governor, the effect of this combination being that the circuit-breaker (operated by the electric current to be measured) gives motion to the clock-work gearing which is more or less rapid, according to the varying force or intensity of the current, the balance-wheel or governor checks the otherwise too rapid motion of the circuit-breaker, and the hands and dial-plates record the aggregate number of volts (or other unit of electro-dynamic force) employed by the electric machine or electric light, &c., to which my device is applied.

In the accompanying drawings, $a$ is the front plate, and $b$ the back plate, connected together by four corner-posts, $c\ c\ c\ c$, which together constitute the frame of the machine.

At one end of the frame is placed the electro-magnet $d$ of the circuit-breaker, which is attached to the frame by the screw $e$, but is insulated from the plate $b$, on which it rests, by a rubber plate, $f$, and bushing $g$ for the screw $e$.

The cores $h\ h$ of the electro-magnet are surrounded by the wire-coiled spools $s\ s$ in the usual way.

The armature $i$ of the circuit-breaker is pivoted to a bracket, $j$, attached to the front plate, $a$, of the frame, so that the armature is immediately over the two poles of the electro-magnet.

The adjustable contact-screw $k$ is inserted through the front plate, $a$, so that its point is over the armature, which is pressed up against the point of the contact-screw $k$ by the spring $l$.

The wire $z$ from one of the poles of the battery, (or electro-magnetic machine, as the case may be,) which generates the electric current, is connected with the screw $e$, which is insulated from the frame of the machine, as before described, and shown in Fig. 5, and thereby forms an electric connection with the cores $h\ h$ of the electro-magnet of the circuit-breaker. The wire $z$ is also connected with one of the helices of the electro-magnet $d$ of the circuit-breaker, and the wire $z'$ from the other end of the helices is connected with the frame-work of the machine, which is electrically connected with the ground or with the other pole of the battery.

By this arrangement of the wires and connection with the battery (which is shown in Fig. 2) the electric current is continuously flowing from one pole of the battery by the wire $z$ through my apparatus to the other pole of the battery, or to the ground by the wire $z'$.

When the armature $i$ is held away from the poles of the electro-magnet $d$ and forced against the contact-screw $k$ by its spring $l$, as in Fig. 2, the electric current passing through the helices around the cores $h\ h$ magnetizes them, and they immediately attract the armature $i$; but as soon as the armature touches the cores $h\ h$ the electric current, seeking the path of least resistance, instead of passing through the helices of the electro-magnet, flows through the cores $h\ h$, and through the armature which is connected with the other pole of the battery, or with the ground, as hereinafter explained. As soon as the electric current leaves the helices and finds its way through the cores $h\ h$ they are demagnetized, and the armature $i$, being no longer held by the attractive power of the magnet, yields to the pressure of its spring $l$, which at once raises it from the poles of the magnet, and, breaking the contact with the armature, restores the circulation of the current through the helices and again magnetizes the cores which attract the armature. This alternate magnetizing and demagnetizing of the cores $h\ h$ of the electro-magnet of the circuit-breaker would cause a continuous vibration of the armature between the poles of the electro-magnet and the contact-screw, which would be extremely rapid were it not otherwise checked and regulated, as hereinafter described.

There is another mode of connecting my device with the poles of the battery, (shown in Fig. 6,) which has the advantage (where a branch current only is carried through my measuring device, as hereinafter explained) of expending only half as much of the electric current as is necessary by the arrangement just described.

The only difference in construction of the apparatus shown in Figs. 2 and 6 is that in Fig. 2 the contact-screw $k$ is in electrical connection with the frame of the machine, so that the electric current is constantly flowing through my measuring-machine, while in Fig. 6 the contact-screw $k$ is insulated from the frame of the machine by a bushing, $a'$, made of india-rubber or other non-conductor. When thus constructed, and as shown in Fig. 6, the contact-screw $k$ is connected with one pole of the battery by the wire C, the armature $i$ of the circuit-breaker is connected by wire $y$ with the helices of the electro-magnet $d$, the other extremity of the helices being connected with the ground. By this arrangement, when the spring $l$ of the armature presses it against the contact-screw $k$ the electric circuit is complete, the current flows through screw $k$, armature $i$, electro-magnet $d$ to the ground at G′; but as soon as this takes place the cores $h\ h$, becoming magnetized, attract the armature $i$, destroy the contact with the screw $k$, and, breaking the circuit, demagnetize the cores $h\ h$ of the electro-magnet, which no longer hold the armature, but allow it to be carried up by its spring into contact with the screw $k$, by which the current is restored and the armature again attracted. By this plan it will be noticed that when the contact of the armature $i$ with the screw $k$ is broken no current passes through my apparatus, as the screw $k$ is not in electrical connection with any part of the mechanism.

I will now proceed to describe how the vibration of the armature operates the devices for indicating the number of these vibrations.

The vibrating arm of the armature $i$, which is pivoted to the bracket $j$, as before described, is extended back of its pivotal point, and to its rear end is attached a pawl, $o$, which takes into the teeth of a ratchet-wheel, $m$, (see Fig. 4,) so that at each vibration of the lever or arm of the armature $i$ the ratchet-wheel is turned the distance of one tooth.

The lever-arm of the armature $i$ is rigidly attached to a horizontal shaft, $n$, which has its bearings in the bracket $j$, and forms the pivot or turning-point of the armature $i$, so that as the armature is vibrated the shaft turns back and forth on its axis.

On one extremity of the shaft $n$ is loosely attached a balance-wheel, $p$, which regulates the motion of the shaft, and consequently the vibrations of the armature.

A hair-spring, $r$, is connected with the balance-wheel and shaft, one extremity being attached to the shaft and the other to one of the spokes of the balance-wheel. As the balance-wheel is loosely attached to the shaft, it can vibrate through a larger arc of a circle than the shaft, the vibration of the shaft being limited by the vibration of the armature with which it is rigidly connected, and the vibration of the armature being limited by the contact-screw $k$. By means of this arrangement the balance-wheel and its hair-spring control the vibration of the shaft, making it very much slower than it otherwise would be; but the control effected by the balance-wheel is not absolute, but is effected by the force applied by means of the electric current to the armature, so that as the force of the current increases the balance-wheel vibrates more rapidly, and, vice versa, as the force of the current diminishes the balance-wheel vibrates more slowly. The connection of the balance-wheel and the shaft through the intervention of the hair-spring compels the shaft to vibrate with the balance-wheel, though through a shorter arc, as before stated, and therefore every vibration of the armature causes the ratchet-wheel $m$ to turn on its axis the distance of one tooth.

It will thus be seen that so long as the electric current is flowing through the measuring apparatus the ratchet-wheel $m$ continues to rotate on its axis more or less rapidly in exact proportion to the intensity of the current. It only remains to record this rotation of the ratchet-wheel by means of the connected clock-gearing.

On the shaft $q$ of the ratchet-wheel $m$ is a short screw, $t$, which gears into the teeth of a cog-wheel, $u$, the shaft of which is at right angles to the shaft $q$ of the ratchet-wheel $m$.

The shaft $x$ of the cog-wheel $u$ extends through the front plate, $g$, and has a hand, $w$, attached to it which revolves with its shaft $x$ around a dial-plate which is properly graduated.

On the shaft $x$ is a pinion, $v$, which meshes into a cog-wheel, $u'$, having ten times as many teeth as the pinion $v$. The shaft of this second cog-wheel $u'$ also extends through the front plate, $a$, and is furnished with a hand, $w'$, which revolves once for every ten revolutions of the hand $w$ and indicates its revolutions on its dial. A pinion, $v'$, on this shaft $u'$ gears into a third cog-wheel, $u''$, on a shaft, $x''$, which also has a hand, $w''$, and dial, and so on, there being as many series of cog-wheels, pinions, shafts with hands, and dial-plates as may be desired, each hand making one revolution around its dial for every ten revolutions of the hand on the next preceding dial, and thus indicating in units, tens, hundreds, and thousands, &c., the unit of measurement of the electric force employed.

In applying the mechanism which I have described to the measurement of the force and quantity of the electric current employed by any electric machine, electric light, or other apparatus operated by galvanism or dynamic electricity, a difficulty occurs in the fact that my measuring mechanism operates by means of an automatic circuit-breaker, and that the alternate closing and breaking of the circuit would, if the entire current passed through my mechanism, break the continuity of the current and interfere with the operation of the machinery or the continuity of the light if applied to an electric candle. To obviate this difficulty I do not permit the entire electric current to pass through my measuring mechanism, nor, indeed, any part of the current which operates the machinery or electric candle; but instead of this I divert from the main current a small portion of the current, which deflected current I pass through my measuring mechanism and thence to the ground. This arrangement is shown in Fig. 6, in which A is the main-line wire; B, the battery (if a battery be used) or other source of the electric current. To this main wire A, I connect a branch wire, C, which is connected with the frame of my measuring mechanism, and is in electric connection with the contact-screw $k$ of the circuit-breaker. A wire, $y$, connects the armature $i$ of the circuit-breaker with one of the helices of the electro-magnet $d$ while the other extremity of the wire runs to the ground at G'.

In order to prevent the entire current from the battery running through my measuring apparatus to the ground at G', instead of passing along the main wire A to do its required work, I interpose a resistance-coil, R, in the branch wire C, between the main wire A and my measuring mechanism. The number of ohms of resistance of the resistance device R being known, the proportion which the deflected current passing off by the branch wire C bears to the whole current of the battery B is easily ascertained, and therefore the amount of current registered by my measuring-instrument will bear the same proportion to the residue of the current which passes on over the main wire A, and is not deflected to pass through my measuring mechanism.

The dial-plates on my measuring apparatus should be marked with reference to the resistance of the resistance device R, so as to indicate at once the force of the current passing over the main wire A less the small current deflected through the branch wire C to operate my measuring mechanism.

What I claim as my invention, and desire to secure by Letters Patent, is—

1. The method hereinbefore described of ascertaining and registering the force and quantity of the electric current by applying the operative force of the current to a balance-wheel, so that the irregularities of its motion or variations from isochronism shall, by means of connected gearing, indicate the corresponding variations of the current, substantially as set forth.

2. The combination, with the vibrating arm of an automatic circuit-breaker, of a balance-wheel loosely attached to the pivotal shaft of the armature and a hair-spring attached at one end to the armature-shaft and at the other end to the balance-wheel, substantially as and for the purpose described.

In testimony whereof I, the said JOSEPH R. FINNEY, have hereunto set my hand.

JOSEPH R. FINNEY.

Witnesses:
A. C. JOHNSTON,
R. C. WRENSHALL.